United States Patent [19]

Paulsson

[11] Patent Number: 4,751,688
[45] Date of Patent: Jun. 14, 1988

[54] DOWNHOLE ELECTROMAGNETIC SEISMIC SOURCE

[75] Inventor: Bjorn N. P. Paulsson, Fullerton, Calif.

[73] Assignee: Chevron Research Company, San Francisco, Calif.

[21] Appl. No.: 8,992

[22] Filed: Jan. 30, 1987

Related U.S. Application Data

[62] Division of Ser. No. 841,073, Mar. 18, 1986, Pat. No. 4,715,470.

[51] Int. Cl.$^4$ .............................................. G01V 1/00
[52] U.S. Cl. ......................................... 367/36; 367/37; 367/57; 181/106
[58] Field of Search .................. 367/25, 36, 37, 57, 367/911, 912; 181/102, 106, 108, 112, 113, 121, 401; 175/40, 50; 166/250, 249; 73/151, 152

[56] References Cited

U.S. PATENT DOCUMENTS

| | | | |
|---|---|---|---|
| 2,522,433 | 9/1950 | Dahlberg | 181/106 |
| 4,214,226 | 7/1980 | Narasimhan et al. | 367/36 |
| 4,298,967 | 11/1981 | Hawkins | 367/25 |
| 4,394,754 | 7/1983 | Waters | 181/102 |
| 4,627,036 | 12/1986 | Wyatt | 367/57 |
| 4,648,039 | 3/1987 | Devaney et al. | 367/47 |
| 4,648,478 | 3/1987 | Dedole et al. | 367/25 |

OTHER PUBLICATIONS

Paulsson et al., "Elastic-Wave Velocities and Attenuation in an Underground Granitic Repository for Nuclear Waste", Geophysics, vol. 50, No. 4 (Apr. 1985); pp. 551-570.

Primary Examiner—Charles T. Jordan
Assistant Examiner—John W. Eldred
Attorney, Agent, or Firm—S. R. LaPaglia; E. J. Keeling; V. A. Norviel

[57] ABSTRACT

The present invention is a downhole seismic source capable of generating seismic forces in excess of 1000 newtons. The source produces seismic waves for seismic applications, particularly cross borehole measurements and vertical seismic profiling. Coupled with motion sensing devices, the present invention also performs as a seismic logging tool. The source is comprised of an outer housing, a means for clamping the source securely to the wellbore, and a linear electromagnetic actuator which utilizes permanent magnetic material having remanent magnetic field exceeding about 0.9 T such as rare earth permanent magnetics. The source has a diameter of about 12.5 cm to fit within a typical wellbore and the acuator has a length of about 1 meter.

9 Claims, 7 Drawing Sheets

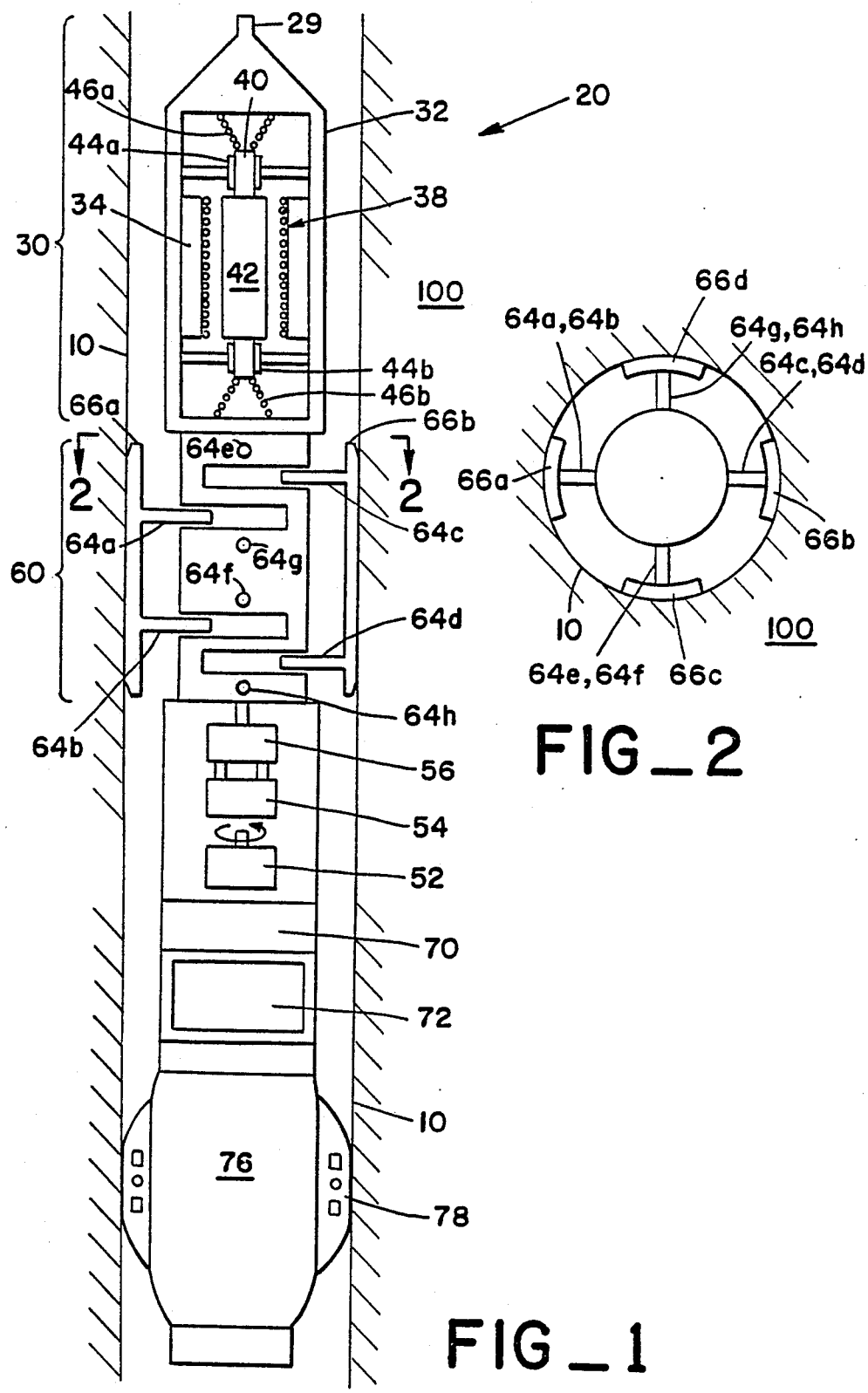

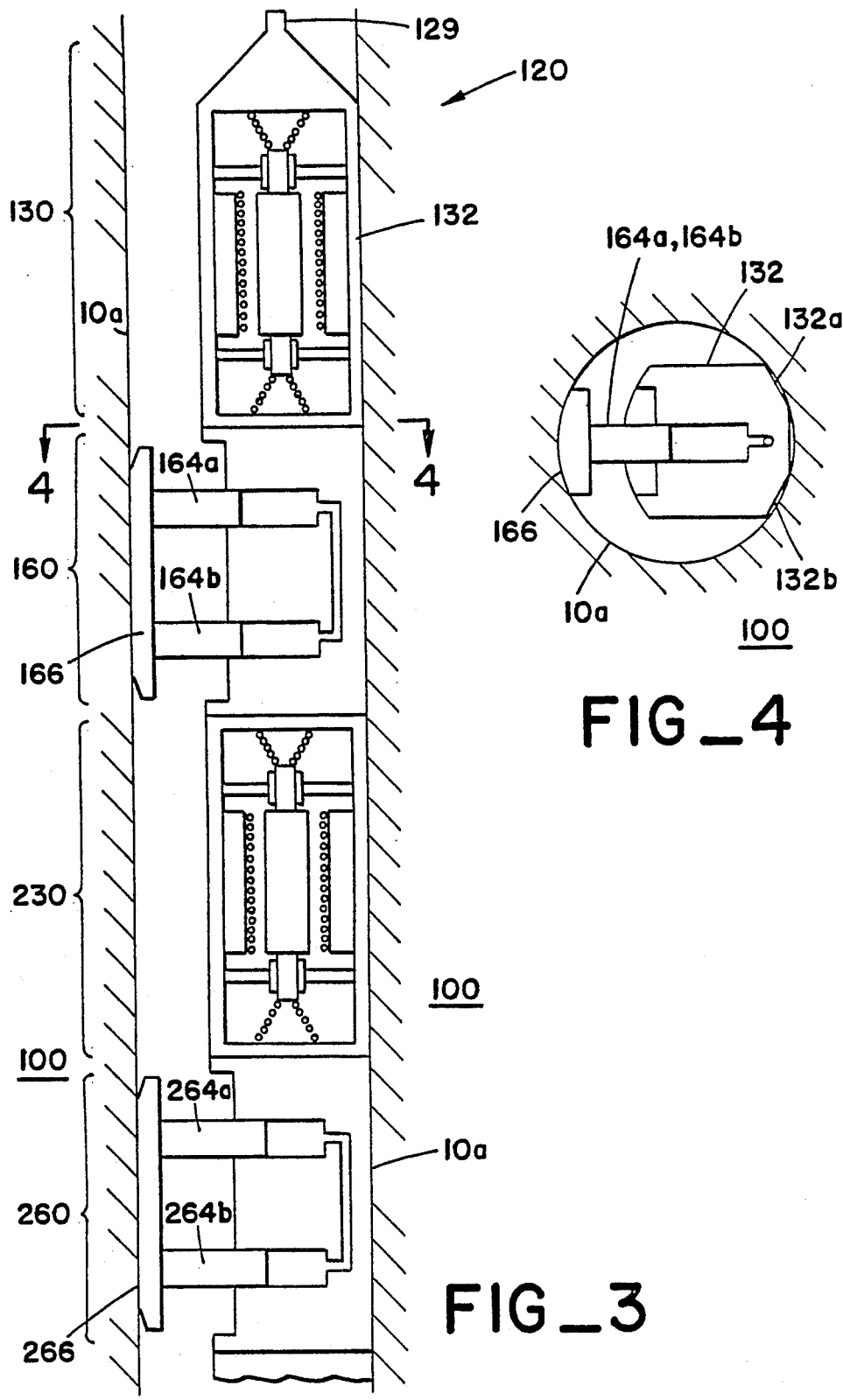

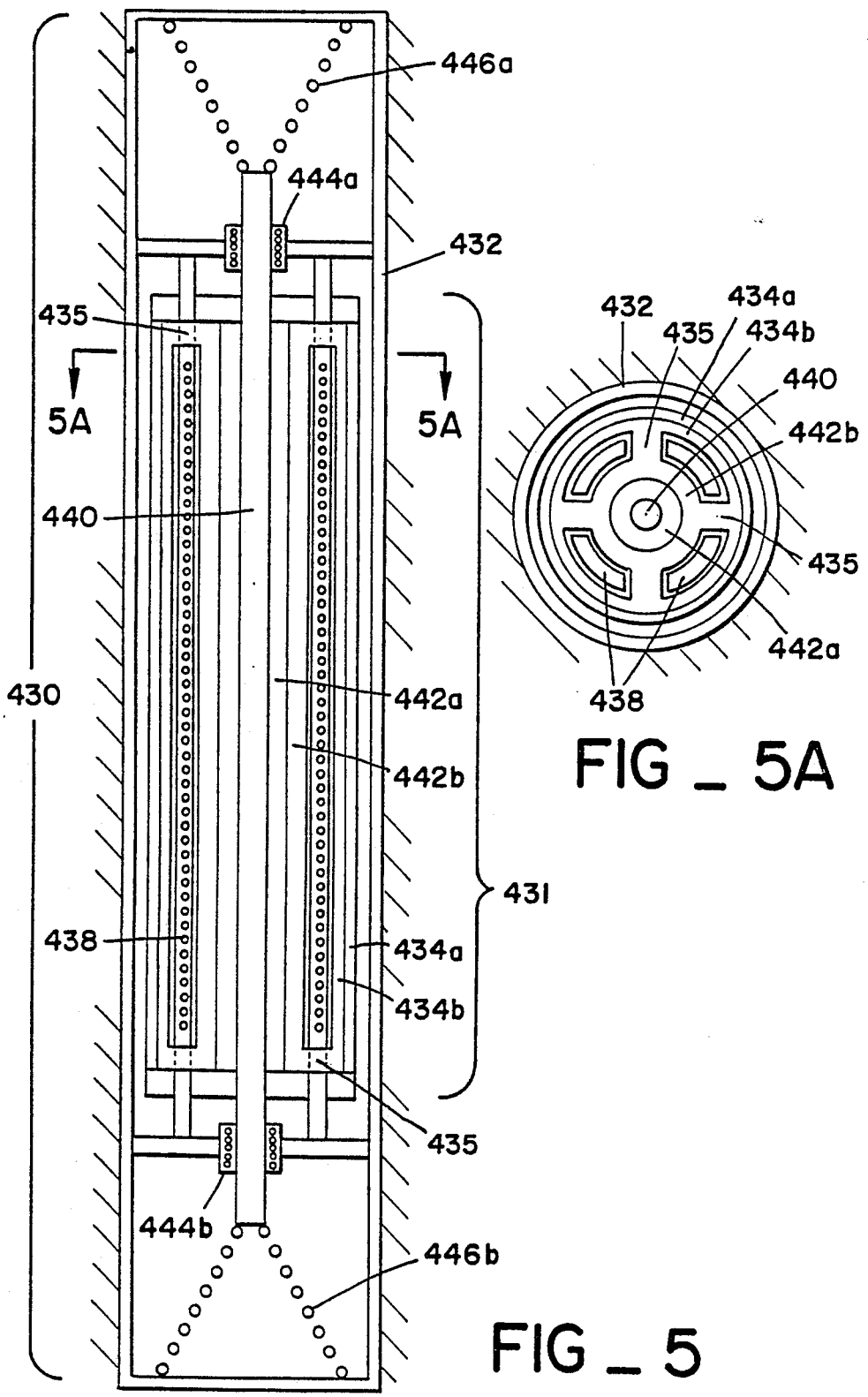
FIG _ 5A
FIG _ 5

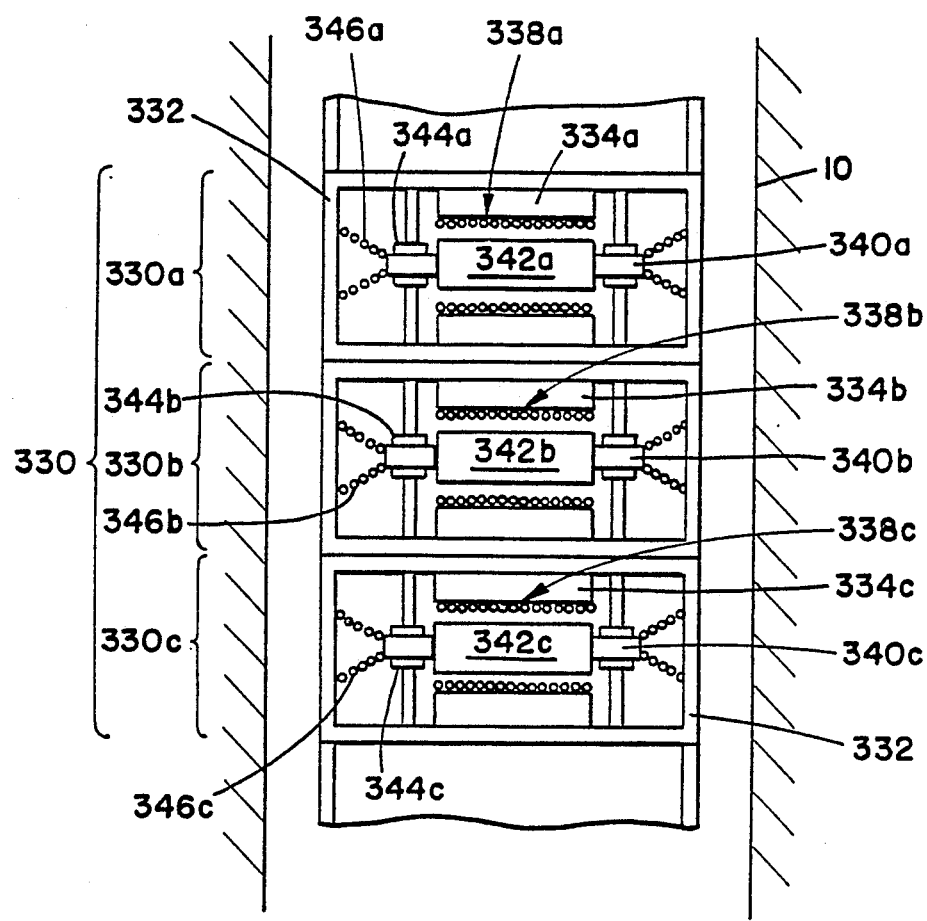
FIG_6

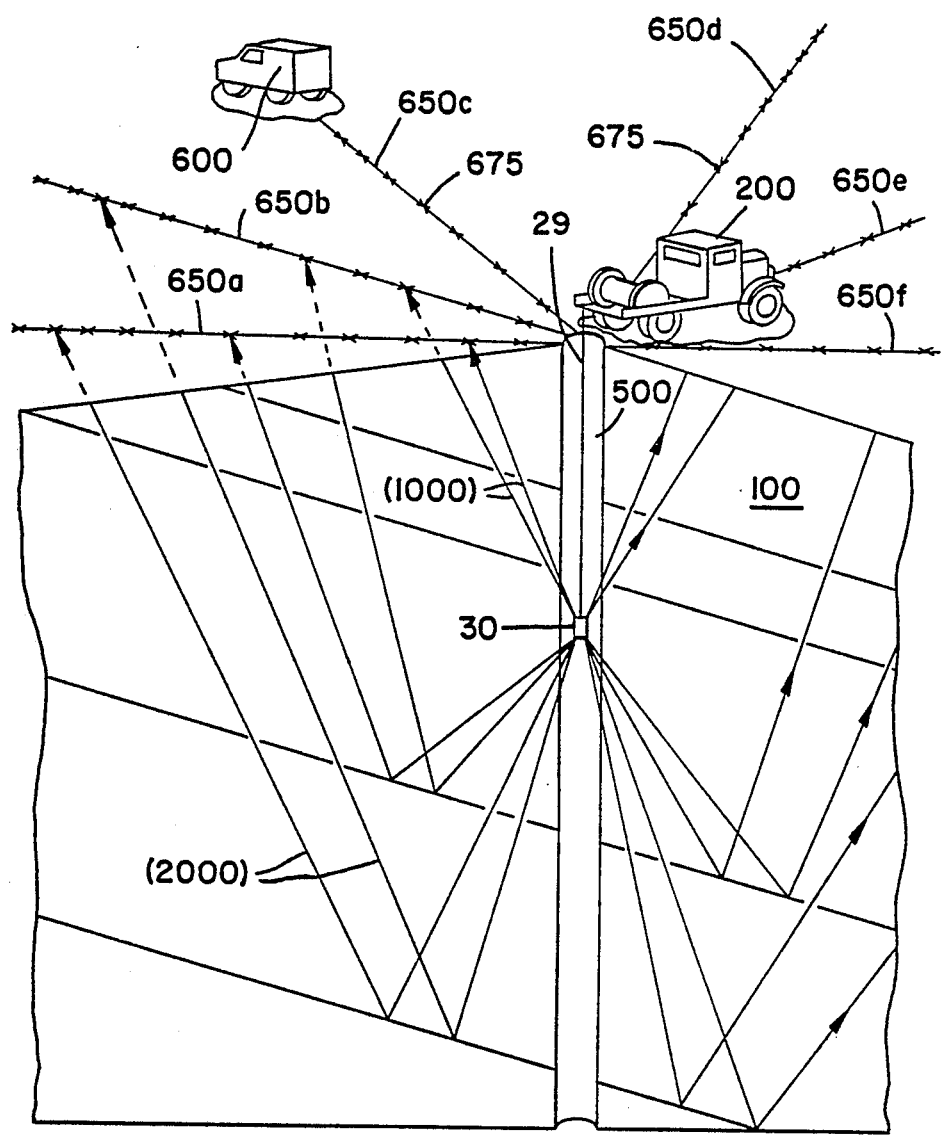
FIG _ 7

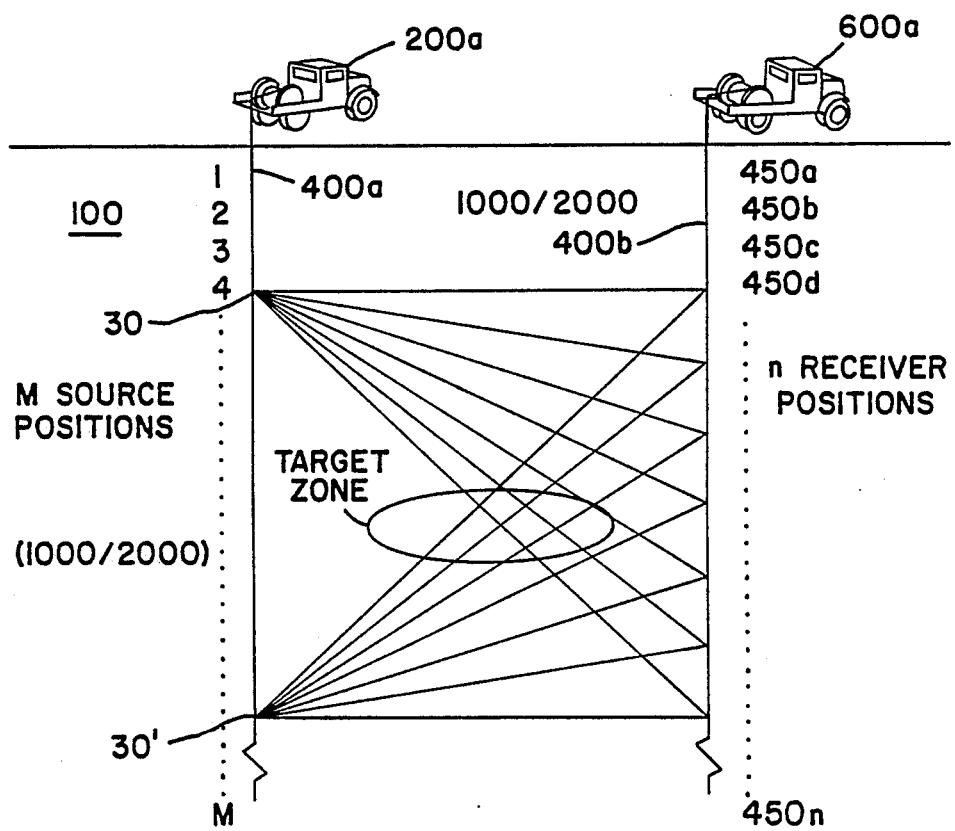
FIG_8

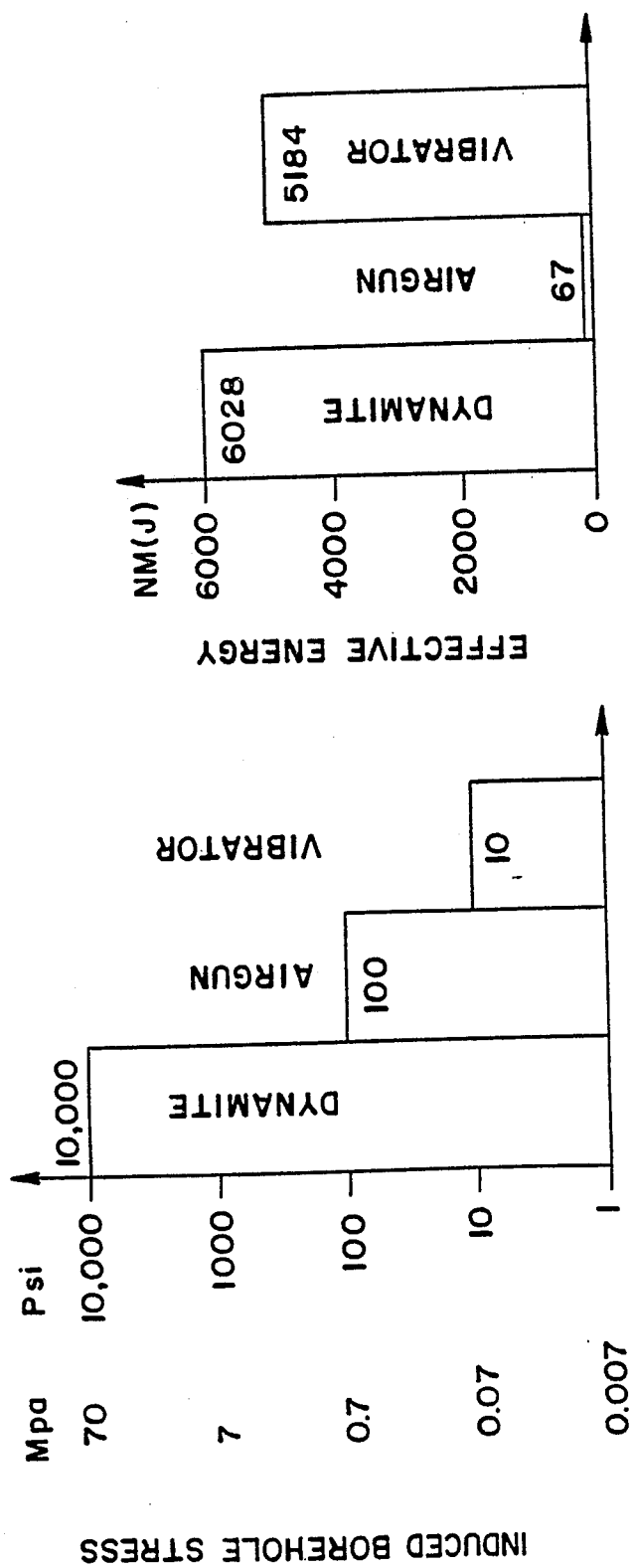

DOWNHOLE ELECTROMAGNETIC SEISMIC SOURCE

This is a division of application Ser. No. 841,073, filed Mar. 18, 1986, now U.S. Pat. No. 4,715,470.

CROSS REFERENCE TO RELATED APPLICATION

This application is related to the application entitled NONDESTRUCTIVE DOWNHOLE SEISMIC VIBRATOR SOURCE AND PROCESSES OF UTILIZING THE VIBRATOR TO OBTAIN INFORMATION ABOUT GEOLOGIC FORMATIONS by BJÖRN N. P. PAULSSON filed concurrently herewith and assigned U.S. Ser. No. 841,073 and filed Mar. 18, 1986. Said application is completely incorporated herein by reference for all purposes.

BACKGROUND OF THE INVENTION

The present invention relates to a downhole seismic energy source which electromagnetically generates seismic waves for geophysical exploration.

The use of seismic sources on the surface is common in geophysical exploration. With the developments in vertical seismic profiling (VSP) and cross borehole technology, the need for a downhole source has increased. A downhole source makes VSP and cross borehole measurement practical, however, downhole seismic sources are uncommon, have limited depth and frequency range, and typically are either low power or destructive.

Due to design constraints of placing a source down a wellbore, at present there is no adequate downhole seismic source. Dimensions of a downhole source are limited by the size of the wellbore. Typical downhole tools must be source must also be able to withstand the temperature, pressure, and fluids encountered at depths of 6000 meters (~2000 ft.) beneath the surface. Adequate power must be transmitted from the surface to the source or the source must carry its own power supply. The source must then generate forces of between 1,000 and 18,000 newtons thereby creating seismic waves which may be detected in another well or from the surface at desired offsets from the well. The downhole source should be controllable and capable of variation in frequencies generated. Most importantly, the downhole source must do all these things without damaging the well.

SUMMARY OF THE INVENTION

The present invention is a downhole seismic source comprising an outer housing, a means for clamping the housing securely within the wellbore, and a linear electromagnetic actuator. The actuator has an armature winding comprised of a multicircuit coil attached to the housing. A reaction mass, constructed of magnetically active material such as iron, is slidably positioned coaxially about the armature winding and vibrates when current is applied to the coil. The reaction mass has a cylindrically shaped inner core which is preferably constructed substantially from rare earth permanent magnetic material and is slidably positioned inside the armature winding. A cylindrically shaped outer core is positioned coaxially outside the armature winding and may be fixed either to the housing or the inner core.

OBJECTS OF THE INVENTION

The design of the present invention permits the miniaturization of a vibrator unit which may fit down a borehole and may achieve force levels of between 1000 and 18,000 newtons heretofore. The present invention generates detectable seismic waves, that is, waves which have been transmitted into the formation and can be detected by sensing devices positioned in the wellbore itself, on the surface, or in an adjacent wellbore. The present invention makes cross borehole measurements and vertical seismic profiles in existing oil field wells practical. Equipped with motion sensors, the present invention may also operate as a downhole seismic logging tool. Power to the vibrator may be supplied electrically downhole using existing technology. The present invention may generate seismic waves in a frequency range of 10–1,500 Hz which is significantly higher range than that achieved by existing pneumatic downhole vibrators.

BRIEF DESCRIPTION OF THE DRAWINGS

FIG. 1 illustrates an embodiment of a downhole seismic source within a cutaway view of a wellbore;

FIG. 2 illustrates a diagrammatic top view section of the downhole seismic source of FIG. 1 taken along line 2—2;

FIC. 3 illustrates a diagrammatic section of an alternative embodiment of a downhole seismic source within a cutaway view of a wellbore;

FIG. 4 illustrates a diagrammatic top view section of the embodiment of FIG. 3 taken along line 4—4;

FIG. 5 illustrates an alternative linear electromagnetic actuator;

FIG. 5A illustrates a diagrammatic top view section of the actuator of FIG. 5 taken along line 5A—5A;

FIG. 6 illustrates a diagrammatic section of an alternative downhole seismic source with a horizontally oriented linear actuator;

FIG. 7 illustrates three-dimensional vertical seismic profiling using the downhole seismic source;

FIG. 8 illustrates cross borehole tomography using the downhole seismic source;

FIG. 9 is a graph comparing borehole stresses between downhole sources of dynamite, airgun, and vibrator; and FIG. 10 is a graph comparing effective energies between downhole sources of dynamite, airgun, and vibrator.

The various process and apparatus embodiments of the invention will be more clearly illustrated by referring to the figures. FIG. 1 illustrates a downhole seismic source 20 within an earth formation 100 penetrated by a wellbore 10 which would typically be completed with casing (not shown) cemented in place. The seismic source 20 is lowered into the wellbore 10 with cable 29.

The seismic source 20 includes a suitable clamping means to couple the source securely in place at a predetermined location within the wellbore. The clamping means should generate a force which is at least greater than the force output generated by the seismic source 20 during operation. This force should be approximately twice the generated vibrating force but in any case less than the force necessary to fracture or break the casing or wellbore liner, or damage the cement. In FIG. 1 and sectional view FIG. 2, a suitable clamping means for coupling the source 20 securely to the wellbore is illustrated as a hydraulic clamping means 60 comprising hydraulic pistons 64a, 64b, 64c, 64d, 64e, 64f, 64g, and 64h connected together by plates 66a, 66b, 66c, and 66d. During the operation of the clamping means and responding from a signal from the surface, electric motor 52 powers hydraulic pump 54. Control valves 54 are actuated such that the hydraulic fluid pressurizes pistons 64a–h forcing them out thereby engaging plates 66a–d with the wellbore 10. Alternatively, a hydraulic line (not shown), which is part of cable 29, may be pressurized from the surface in order to actuate the pistons 64a–h. Such an alternative supply of hydraulic pressure may prove more convenient for shallow wells.

The surface of plates 66a–d may be serrated or grooved to provide additional friction between the vibrator surface and the borehole wall. Such serrations generate very high point forces when clamping plates 66a–d contact wellbore 10, thereby eliminating or minimizing slippage.

An electromagnetic linear actuator means 30 is attached to the housing 32 by any suitable means such as bolts, welds and the like. The actuator 30 comprises a cylindrically shaped shell 34 having an outer portion attached to the housing 32 and an inner portion which may be constructed of magnetically active material. An attached to the inner portion or the cylindrical shell 34, An inner core reaction mass 42 is slidably positioned inside of the armature winding 38. The inner core reaction mass 42 is also substantially constructed of magnetically active material, such as iron or iron alloys, or permanent magnetics. To achieve higher forces, rare earth permanent magnetic material such as samarium cobalt or Neodymium-Iron-Boron may be utilized for construction of reaction mass 42 or shell 34. It is anticipated that the reaction mass 42 will be constructed substantially from a permanent magnetic material having a remanent magnetic field of at least 0.9 T such as the rare earth permanent magnetics. In the preferred embodiment of actuator 30, reaction mass 42 will have an iron core laminated with the rare earth permanent magnetic material. The reaction mass 42 has a center shaft 40 which may be constructed of stainless steel for mechanical constraints and may be aligned by linear bushings 44a&b. The reaction mass 42 may be supported by variable rate springs 46a&b to neutralize the weight of the reaction mass 42.

It is also conceivable that the armature windings 38 could be attached to the reaction mass 42 instead of outer shell 34. In such a design the outer shell 34 would probably be constructed from rare earth permanent magnetic material and the armature windings 38 would comprise part of the moveable reaction mass 42.

The multicircuit coils of armature windings 38 are designed to vibrate the reaction mass 42 parallel to the borehole 10. For example, since the typical borehole is vertical in orientation, the reaction mass 42 will also vibrate in a vertical direction. Such a motion will impart forces into the formation 100 generating vertical shear waves ($S_v$-waves) in the horizontal direction and compressional waves (P-waves) from the vertical to subvertical (0°–45° from vertical) direction.

The inner core reaction mass 42 of actuator 30, having a mass of approximately 100 kg, will be approximately 1 meter in length to achieve forces in excess of 1000 newtons. It is envisioned that longer reaction masses of 2 meters in length may provide greater forces or superior vibrator characteristics. The design of the present invention may be capable of achieving forces of up to 18,000 newtons. includes motion sensing devices which are secured to the borehole wall 10 by expandable boot 76. Sensing devices 78 are seismic sensing devices, such as accelerometers or geophones, designed to detect vibration of the wellbore wall 10. The sensing devices 78 are vibrationally isolated from the rest of the seismic source by an acoustic isolator 70.

Additional motion sensing devices (not shown) may be included within the seismic source 20 which are not isolated from the linear actuator 30. By comparing signals from the isolated sensing devices 78 and the nonisolated devices, information may be obtained on the clamping effectiveness and the energy transmission into the formation.

An electronics package 72 receives command signals from the surface and controls the various components of the seismic source. The electronics package also receives signals from the motion sensing devices 78 and transmits them to the surface. It is preferred that the electronics package 72 be isolated from the vibrations of actuator 30 by the acoustic isolator 70 to avoid vibration damage to sensitive electronic instruments. Further vibrational protection may be achieved by positioning the electronics package 72 below the boot 76 and motion sensing devices 78.

Alternatively, multiple actuators, two or more in series, may be included within a single source. FIG. 3 shows a section of an alternative embodiment of an electromagnetic source 120 having two linear electromagnetic actuators 130 & 230. Though details of actuators 130 and 230 are not identified, the design is the same as the actuator 30 of FIG. 1 in all respects. The source 120 is lowered into wellbore 10a by cable 129. FIGS. 3 and 4 also show an alternate clamping means 160 having a single plate 166 actuated by pistons 164a&b into contact with wellbore 10a and pushing the housing 132 of source 120 against the opposite side of wellbore 10a. The housing 132 contacts the wellbore 10a at its contact pads 132a&b.

FIG. 3 also shows an alternative embodiment by the addition of a second clamping means 260 which provides additional clamping stability for source 120. Plate 266 is actuated by pistons 264a&b, while first clamping means 160 clamping means 160 and 260 push housing 132 against the opposite side of wellbore 10a coupling the source 120 securely within the wellbore 10a.

The surfaces of contact plates 166 and 266 and contact pads 132a&b may be serrated or grooved to improve friction contact between the surfaces and wellbore 10a.

FIGS. 5 and 5A illustrate the preferred embodiments for the linear electromagnetic actuator of the present invention. The actuator 430 of FIG. 5 also more closely approximates the relative length to width proportions of the actuator (as compared to the compressed appearance of actuator 30 in FIG. 1). FIG. 5 shows an armature winding 438 comprised of multicircuit coils attached to the housing 432. The armature winding 438 has a cylindrical shape about a center axis. Both inside and surrounding the armature winding 438 is the reaction mass 431 comprised of a center shaft 440, an inner core 442a/b and an outer core 434a/b. The center shaft 440 is coaxially positioned within the armature winding 438. Center shaft 440 is adapted to be slidably movable along its lengthwise axis. A cylindrically shaped inner core 442a/b is attached to the center shaft 440 and is coaxially positioned between armature winding 438 and center shaft 440. The outer core 434a/b is also attached to center shaft 440 and is coaxially positioned outside the armature winding 438. A bridging means 435 passes through the coils of armature winding 438 connecting the outer core 434a/b to center shaft 440. Both the inner core 442a/b and the outer core 434a/b are constructed from magnetically active material such as iron, iron alloys, or permanent magnetics. To achieve higher forces, a permanent magnetic material having a high remanent magnetic field of at least 0.8 T or higher may be required. A remanent magnetic field of 0.9 T or higher would be preferred. Rare earth permanent magnetic material such as samarium cobalt or Neodymium-Iron-Boron may be utilized.

Center shaft 440 may be constructed of stainless steel if required for mechanical properties and may be aligned by linear bushings 444a&b. The reaction mass 431 may be supported by variable rate springs 446a&b. feasible designs for an optimum actuator. FIG. 5 illustrates two preferred designs. The first embodiment has the inner core 442a/b constructed substantially from rare earth permanent magnetic material. Specifically, the inner core outer portion 442b will be constructed from rare earth permanent magnetic material while the inner core inner portion 442a and outer core 434a/b are constructed from a magnetically active material such as iron or iron alloy (in this case not permanent magnetics).

Such an optimum design provides a complete path for the magnetic field around the armature winding 438 efficiently utilizing the superior magnetic characteristics of the rare earth permanent magnetic material. The inner core outer portion 442b is a layer of rare earth permanent magnetic material next to the armature winding 438 which reacts with the magnetic field from the armature winding 438. The inner core inner portion 442a constructed from iron provides a magnetic path along the center of the the reaction mass 431 inside the armature winding 438. The outer core 434a/b also constructed from iron provides a path for the magnetic field outside the armature winding 438.

The second preferred embodiment has the outer core 434a/b substantially constructed from rare earth permanent magnetic material. Specifically, the outer core inner portion 434b is constructed from rare earth permanent magnetic material with the outer core outer portion 434a and inner core 442a/b constructed of magnetically active materials such as iron or iron alloys (nonpermanent magnetics).

It is also conceivable that the armature windings 438 could comprise part of the moveable reaction mass and be attached to shaft 440. The magnetic field would still be through inner core 442a/b and outer core 434a/b, but they would be attached to housing 432 instead of shaft 440.

All the embodiment already described have an electromagnetic armature winding reacting with a magnetically active material. It is also conceivable that the actuator may be comprised of electromagnetic coils both attached to the housing and coils in the reaction mass. A configuration. Downhoie cooling, such as immersion in liquid nitrogen, may be required. Super conductors may be required due to size limitations. Super conductors producing super magnets may be feasible provided the engineering details are worked out.

There are instances when a geophysicist would desire this source to produce horizontal shear waves ($S_H$-waves). The multicircuit coils of armature windings 38 (shown in FIG. 1) may be designed to exert torsional force on the inner core reaction mass 42 thereby rotating the reaction mass. By alternating the current direction, reaction mass 42 may vibrate in a twisting motion relative to the lengthwise axis of shaft 40. Such a motion will generate a horizontal shear wave ($S_H$-wave) into the formation 100. The armature windings 438 of FIG. 5 may be similarly adapted to provide torsional motion.

There are instances where a compressional wave (P-wave) is desirable. FIG. 6 shows still another alternative electromagnetic linear actuator 330 which generates horizontal accelerations. A series of small actuators 330a, 330b, and 330c are oriented perpendicularly to the wellbore 10 which, relative to a vertical wellbore, would be in a horizontal direction. The actuators 330a-c are comprised of cylindrically shaped shells 334a-c having outer portions attached to an outer housing 332 and inner portions which may be constructed substantially of magnetically active material. Armature windings 338a-c comprised of multicircuit coils are secured to the inner portions of shells 334a-c. The reaction masses 342a-c are constructed of magnetically active material and have center shafts 340a-c aligned by linear bushings 344a-c. The reaction masses 342a-c may be supported by variable rate springs 346a-c to neutralize the weight of the reaction masses 342a-c or improve inertia characteristics. Though FIG. 6 shows three actuators (330a-c), it is conceivable that other numbers of actuators may be configured within a single seismic source. Since the vertically oriented actuator of FIG. 1 may be approximately one meter in length, it is envisioned the horizontally oriented source of FIG. 6 may require ten or more actuators similar to actuator 330a. The actuator 430 of FIG. 5 may also be similarly adapted to horizontal orientation. reaction masses 342a-c vibrate in a horizontal direction perpendicular to the wellbore. Such a motion will impart forces into the formation generating compression waves (P-waves) in the horizontal direction and vertical shear waves ($S_V$-waves) from the vertical to sub-vertical (0°-45° from vertical) direction.

When the actuator is oriented perpendicularly as the actuators 330a-c of FIG. 6, it is anticipated that the tool will required dual clamping means (such as indicated by FIG. 3) with the actuators located between the clamps (the same location as actuator 230 in FIG. 3). Also anticipated is the probable need for clamp design alternative to the hydraulically actuated pads. A particular problem occurs when the motion of actuator vibration is in the same direction as the clamp actuators as in the case of a perpendicularly oriented actuator. The fluid filled pistons of the clamp actuators act as a shock absorber which distort or absorb vibrational energy intended to be transmitted into the formation. An alternate clamp design would be preferred such as a wedge clamp design. A driving mechanism such as a hydraulic piston or a mechanical screwdrive drives a driving wedge parallel to the borehole which in turn drives contact wedges which are dovetail to the driving wedge out into contact with the wellbore. Such a wedge clamp design does not depend solely on hydraulic pressure in the direction of vibratory motion to secure the tool.

Crucial to the present invention is the small, high-powered linear actuator. Referring to FIG. 1 for example, the reaction mass 42 is substantially constructed from a rare earth permanent magnetic material such as samarium cobalt or Neodymium-Iron-Boron. Alternatively, the reaction mass 42 may be constructed of iron or iron alloy and laminated with the rare earth permanent magnetic material.

Such linear actuators are available from a suitable electric motor manufacturer. General Electric, for example, designs motors for automobile power windows which must utilize rare earth permanent magnets to achieve adequate output power but fit inside a car door. By providing appropriate specifications to a motor manufacturer which does custom motor design work such as Plainview, Long Island, N.Y., the desired actuator may be obtained. For example, one could specify a linear electromagnetic actuator of no more than about 10 cm (~4 inches) in diameter, $1\frac{1}{2}$–2 meters in length, and generating a magnetic field of sufficient magnitude to accelerate a reaction mass thereby producing vibratory force of up to and exceeding 6,000 newtons.

FIG. 7 pictorially illustrates a cutaway three-dimensional view of a vertical seismic profiling (VSP) operation using the downhole seismic source 30. VSP can be easily and quickly accomplished through the use of a downhole seismic source 30 to generate the seismic wave with a multitude of surface geophones 675 along geophone strings 650a–d connected to a recording truck 600. The logging truck 200 lowers the seismic source 30 on cable 29 into wellbore 500. The seismic source 30 is operated to generate the seismic waves of interest, i.e., $S_V$-waves, P-waves or $S_H$-waves, while the geophones record the direct and reflected seismic waves (1000/2000). Since the geophones do not have to be lowered into the wellbore environment and a vast array of surface geophones may be utilized, the profiling of the formation may be done quickly and efficiently.

FIG. 8 illustrates the use of a downhole seismic source 30 to perform crosswell tomography. In crosswell tomography, a logging truck 200a lowers into a first well 400a at least one or a plurality of seismic sources 30 which generate the desired seismic waves, i.e., $S_V$-waves, $S_H$-waves, or P-waves, directed out into the formation 100 toward at least one receiver well 400b. The well 400b contains geophones 650a–d suspended therein and connected to the appropriate recording truck 600a on the surface. As the seismic source or sources 30 in well 400a generate seismic waves, these waves are detected by receivers 650a–n within the well 400b thereby generating a relative seismic picture of the geologic formation between wells 400a and 400b. Since the weathering layer normally attenuates seismic waves generated on the surface, surface to well tomography cannot be carried out for frequencies greater than about 100 Hz due to the attenuation problems. Of course, the lower the frequency, the less refined the seismic waves and thus the lower the resolution. Use of the downhole seismic source of the present invention according to FIG. 8 enables the generation of high frequency seismic waves, i.e., greater than 100 Hz, to raise the resolution and narrow the field of view so that smaller and smaller zones within a given formation may be viewed. The technique can be extremely valuable for applications where the oil producing zones are relatively thin and thus information about them is hard to obtain. This technique may also have application for detecting fracture zone in a rockmass candidate for high level nuclear waste storage or for monitoring the thermal load from high level nuclear waste emplaced in a rockmass.

FIG. 9 and FIG. 10 are graphs comparing the borehole stresses and effective energies between several downhole sources, namely a 500 gram (1.1 lb) dynamite charge, a 655 cu.cm. (40 cu. inch) airgun, and a vibrator having an 18,000 newton (4,000 lbf) output. The values are applicable around 100 hz, a frequency which is within the usual frequency band. The figures show the vibrator may achieve high effective energies with low borehole stresses. The 10 psi borehole stress induced by the vibrator is only half the recommended maximum induced shear stress on the casing cement interface according to American Petroleum Institute standards (API RP2A Oct. 22, 1984).

The motion sensing devices 78 shown in FIG. 1 also enable the present invention to operate as a downhole seismic logging tool. The seismic vibrations generated by the actuator 30 travel into the formation 100 where they are reflected or refracted back and then detected by the sensing devices 78. The sensing devices are isolated from tool vibrations by isolating means 70. By analyzing the signals detected, information about the formation surrounding the wellbore may be deduced. Most surface seismic recording is in a range of 10 to 200 hz. The downhole vibrator of the present invention may generate seismic signals at the same frequency as that recorded from surface seismic sources. Logs obtained by the present invention using the same frequency as surface generated seismic data will provide better correlation with surface generated seismic data than that obtained by existing logging tools which operate at greater wave penetration than existing tools because of its higher power output capability.

Three component geophones and/or accelerometers are preferred for the motion sensors 78. Though FIG. 1 illustrates only a single motion sensor package (76 and 78), a series of separately coupled sensor packages is envisioned. Each sensor package would be acoustically isolated from both the other seismic sensor packages and the seismic source housing 32.

The present seismic source can be used to perform the processes of copending application entitled NONDESTRUCTIVE DOWNHOLE SEISMIC VIBRATOR SOURCE AND PROCESSES OF UTILIZING THE VIBRATOR TO OBTAIN INFORMATION ABOUT GEOLOGIC FORMATIONS by BJÖRN N. P. PAULSSON filed concurrently herewith and assigned U.S. Ser. No. 841,073 and filed Mar. 18, 1986. Said application is completely incorporated here by reference for all purposes.

The invention has been described with reference to particularly preferred processes of using the downhole seismic source and particularly preferred embodiments of the electromagnetic downhole seismic vibrator source. Modifications which would be obvious to one of ordinary skill in the art are contemplated to be within the scope of the invention.

I claim:

1. A method for obtaining information form a formation penetrated by a wellbore comprising the steps of:
    lowering a nondestructive downhole seismic source into a wellbore penetrating a formation;
    periodically stopping said seismic source at predetermined locations within the wellbore;
    clamping the seismic source to the wellbore while it is stopped;
    electromagnetically vibrating a reaction mass to generate substantially shear and pressure seismic waves while the seismic source is clamped; and
    detecting the seismic waves at a desired position.

2. The method according to claim 1 further comprising the steps of: recording the seismic waves.

3. The method according to claim 2 wherein the detecting occurs from the group of positions consisting of: on the surface, within the same wellbore, within an adjacent wellbore, and combinations thereof.

4. The method according to claim 3 wherein the step of detecting is performed by geophones.

5. The method according to claim 3 wherein the steps of detecting and recording comprise:
  detecting the direct and reflected seismic waves with geophones;
  recording the direct and reflected seismic waves; and
  processing the recorded seismic waves to generate a vertical seismic profile image.

6. The method according to claim 3 wherein the detecting occurs within an adjacent well and the recorded seismic waves are processed to generate a cross-well tomographic image of the formation between the source well and receiver well.

7. The method according to claim 3 wherein the maximum frequency of said seismic waves is greater than about 100 Hz.

8. The method according to claim 3 wherein the recorded seismic waves are processed to generate a vertical seismic profile image.

9. The method according to claim 1 wherein the seismic waves are detected within the same wellbore.

* * * * *